B. WHITE.
UNIT NON-SKID CHAIN DEVICE.
APPLICATION FILED JAN. 15, 1918.

1,297,620.

Patented Mar. 18, 1919.

INVENTOR
Bishop White
BY
Harry L. Ullman ATTORNEY

UNITED STATES PATENT OFFICE.

BISHOP WHITE, OF WEST HARTFORD, CONNECTICUT, ASSIGNOR TO AMERICAN CHAIN COMPANY, INCORPORATED, OF BRIDGEPORT, CONNECTICUT, A CORPORATION OF NEW YORK.

UNIT NON-SKID CHAIN DEVICE.

1,297,620.  Specification of Letters Patent.  Patented Mar. 18, 1919.

Application filed January 15, 1918. Serial No. 211,942.

*To all whom it may concern:*

Be it known that I, BISHOP WHITE, a citizen of the United States, and resident of West Hartford, county of Hartford, State of Connecticut, have made a certain new and useful Invention Relating to Unit Non-Skid Chain Devices, of which the following is a specification, taken in connection with the accompanying drawing, which forms part of the same.

This invention relates especially to unit non-skid chain devices adapted for use on motor trucks or other vehicles in which a tread chain which may be formed of heavy curbed links to give the desired traction is detachably arranged to extend one or more times around the tire and felly and may be loosely held in place circumferentially as by the attached spoke chain adapted to encircle a spoke of the wheel or other securing device. The unit, of which six or eight or more may be secured to each driving wheel, may comprise the tread chain and spoke chain and also a securing chain which may be attached to the junction thereof and be provided with a securing hook which is preferably adapted to pass through an annular or other loop member on the spoke chain and to be detachably hooked into one of the links of the tread chain so as to hold the entire unit in service position on the wheel. The securing hook which may of course be used in other connections, is preferably formed with a constricted throat or admission passage and a hook locking member or link loosely connected to the securing chain is normally located in this admission passage so as to block or close the same so long as there is any substantial tension or pull on the hook. When, however, the hook is forced backward this locking link or member moves down out of the admission passage into the loop or enlarged lower portion of the hook so that a link may pass through this admission passage as for disconnecting it from the hook.

In the accompanying drawing showing in a somewhat diagrammatic way illustrative embodiments of the invention, Figure 1 is a sectional view showing the device arranged on the wheel, parts being broken away for greater clearness.

Figure 3:
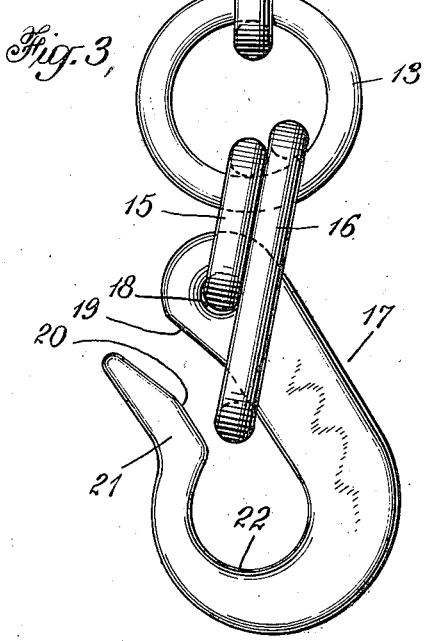
Fig. 3 is an enlarged side view of the securing hook and related devices.

The tread chain 5, which may be of curbed links of any suitable size and construction to give the traction and wearing qualities desired, may have its end link 6 connected to the securing chain link, such as 9, 10, in any suitable way as by the ring 8. The securing hook 17 may be connected to this securing chain in any convenient manner as by a securing member or ring 13 and hook connector link 15 passing through a hole 18 in the hook, for instance, so as to loosely connect these parts as indicated in greater detail in Figs. 3 and 4. The hook 17 may advantageously be formed with a substantially flat shank or body portion and with a constricted throat or admission passage adjacent the point 21 of the hook. The sides 19, 20 of this admission passage may, if desired, be substantially parallel so as to form a relatively narrow passage leading to the enlarged opening or loop 22 of the hook. Any suitable hook locking member or link 16 which may be loosely connected to the securing ring or chain normally lies within this hook admission passage so as to block the same when there is any substantial tension or strain on the hook and this may be conveniently effected by forming the locking link 16 of such shape as not to ride or pass over the connector link 15, as for instance, by making the locking link with substantially parallel sides loosely embracing the shank of the hook. As shown in Fig. 3 the hook when hanging free is supported by the connector link 15, the locking link 16 entering the admission passage sufficiently to substantially block the same and prevent passage of a link therethrough and of course when a chain link within the hook loop 22 is pulling downward the hook will naturally assume a still more vertical position in line with the connector link 15 so that the locking link will be forced still farther into the admission passage and more effectively block the same. At the same time the mere releasing of the tension on the hook and swinging it up into some such inclined position as indicated in Fig. 4 swings the locking link 16 into the hook loop 22, especially if the securing ring 13 has a smaller internal diameter than indicated in the drawing which is advantageous in some cases; so that another chain link might be inserted or withdrawn from the hook through the admission passage therein under these conditions.

Figure 1:
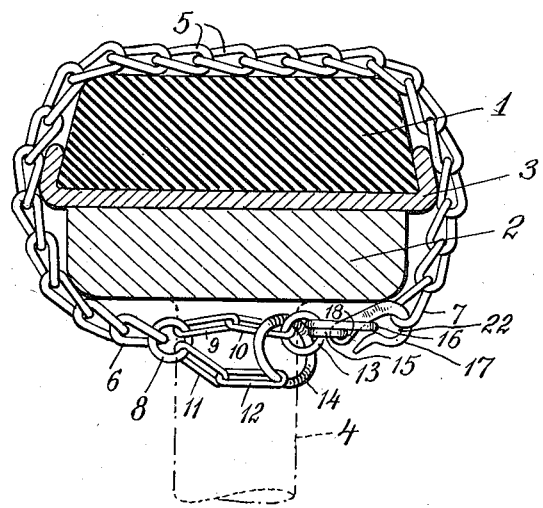
Figure 2:
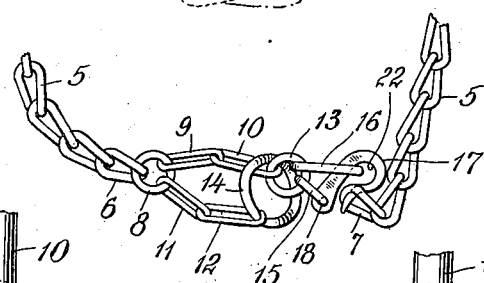
Fig. 2 is a view partially broken away showing the way in which the device is connected or attached.
Figure 4:
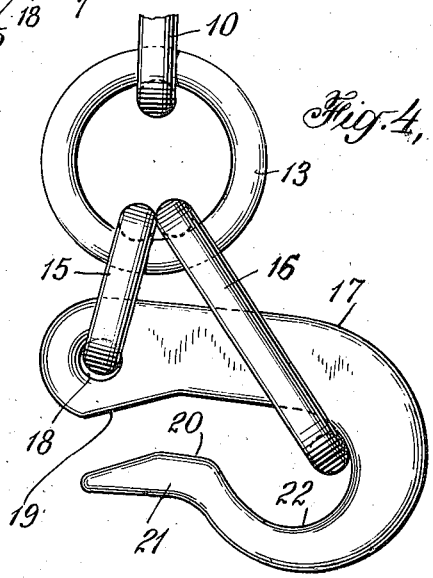
Fig. 4 is a corresponding view thereof showing the hook in its unlocked or receiving position.

This securing hook makes it possible to readily and detachably secure the tread chain in position around the tire 1 which may be supported by a rim or tire flange 3 on the felly 2 and the securing hook may, for instance, be hooked into any one of the end links of the tread chain, such as 7, and under running conditions there is always sufficient tension in the chain links to prevent the securing hook swinging back into the releasing position shown in Fig. 4. If desired also the device may comprise a loop or length of chain adapted to encircle a spoke of the wheel or other securing device and for this purpose suitable spoke chain links, such as 11, 12, may be connected to the ring 8 and to a suitable annular or other loop-member 14 of sufficient size so that the securing hook may pass therethrough in connecting the device which is thus permanently connected so as to constitute a non-skid unit which is still more convenient because the parts cannot become separated or lost. The spoke chain may be passed one or more times around a spoke 4 of the wheel and the securing hook passed through its loop member 14 and then connected with one of the tread chain links so that, for instance, the unit may be arranged in some such position as indicated in Fig. 1. The device may, of course, be readily disconnected from the wheel by swinging back the securing hook as indicated in Figs. 2 and 4 so that the tread chain link 7 may be withdrawn, the hook being thereupon withdrawn from the loop 14 which allows the entire device to be stored on the motor truck, for instance, until again needed.

This invention has been described in connection with a number of illustrative embodiments, forms, proportions, materials, parts, arrangements and methods of manufacture, and use, to the details of which disclosure the invention is not of course to be limited, since what is claimed as new and what is desired to be secured by Letters Patent is set forth in the appended claims.

1. The unit non-skid chain device comprising a tread chain and a securing chain and spoke chain permanently connected thereto, an annular loop member on the end of said spoke chain, a securing ring and securing hook on the end of said securing chain and adapted to pass through said loop member and be carried around a spoke and be disengageably hooked into one of the links of said tread chain to hold the same around the tire and rim of the wheel, said securing hook being formed with a substantially parallel constricted admission passage and a parallel sided hook locking link loosely embracing the shank of said hook and connected to said securing ring to be drawn into and substantially block said admission passage when there is substantial tension on said hook.

2. The unit non-skid chain device comprising a tread chain and a securing chain and spoke chain permanently connected thereto, a loop member on the end of said spoke chain, a securing hook on the end of said securing chain and adapted to pass through said loop member and be carried around a spoke and be disengageably hooked into one of the links of said tread chain to hold the same around the tire and rim of the wheel, said securing hook being formed with a substantially parallel constricted admission passage and a parallel sided hook locking link loosely embracing the shank of said hook to be drawn into and substantially block said admission passage when there is substantial tension on said hook.

3. The unit non-skid chain device comprising a tread chain and a securing chain and spoke chain connected thereto, a loop member on the end of said spoke chain, a securing hook on the end of said securing chain and adapted to pass through said loop member and be carried around a spoke and be disengageably hooked into one of the links of said tread chain to hold the same around the tire and rim of the wheel, said securing hook being formed with a constricted admission passage and a hook locking member loosely coöperating with the shank of said hook to substantially block said admission passage when there is substantial tension on said hook.

4. The unit non-skid chain device comprising a tread portion and a securing portion permanently connected thereto, a securing hook and an interposed connector link on the end of said securing portion and adapted to be disengageably hooked into one of the links of said tread portion to hold the same around the tire and rim of the wheel, said securing hook being formed with a constricted admission passage and a locking link connected to said securing portion and loosely embracing the shank of said hook adjacent said connector link to be drawn up into and substantially block said admission passage when there is substantial tension on said hook.

5. The hook securing device adapted for use in unit non-skid chain grips and comprising a securing member a securing hook, a connector link between said hook and said securing member, said securing hook being formed with a substantially uniform width constricted admission passage and a parallel sided hook locking link of greater length than said connector link and loosely embracing the shank of said hook between the receiving loop of said hook and said connector link and connected to said securing member to be drawn into and substantially block said admission passage when there is substantial tension on said hook.

6. The hook securing device comprising a securing member, a securing hook, a connector link between asid hook and said securing member, said securing hook being formed with a constricted admission passage and a hook locking link of greater length than said connector link and loosely embracing the shank of said hook between the receiving loop of said hook and said connector link and connected to said securing member to be drawn into said admission passage when there is substantial tension on said hook.

7. The hook securing device comprising a securing member, a securing hook, a connector link between said hook and said securing member, said securing hook being formed with a constricted admission passage and a hook locking member of greater length than said connector link and connected to said securing member to have its end drawn up into said admission passage when there is substantial tension on said hook.

8. The unit non-skid chain device comprising a tread chain and a securing chain and spoke chain permanently connected thereto, a loop member on the end of said spoke chain, and a securing hook on the end of said securing chain and adapted to pass through said loop member and be carried around a spoke and be disengageably hooked into one of the links of said tread chain to hold the same around the tire and rim of the wheel.

BISHOP WHITE.

Witnesses:
  JOHN R. REYBURN,
  HAROLD J. HUNT.